UNITED STATES PATENT OFFICE.

GIUSEPPE CUSATELLI, OF TARANTO, ITALY.

PROCESS OF MAKING SUPERPHOSPHATES.

997,968. Specification of Letters Patent. Patented July 18, 1911.

No Drawing. Application filed July 6, 1910. Serial No. 570,593.

*To all whom it may concern:*

Be it known that I, GIUSEPPE CUSATELLI, doctor of chemistry, of Taranto, Italy, have invented certain new and useful Improvements in Processes of Making Superphosphates, and of which the following is a specification.

The object of the present invention consists of an improved process of manufacture of superphosphates, which improves the quality of the product and renders its manufacture more economical, through the industrial application of important reactive properties of nitric acid on the molecule of tricalcic phosphate and on the substances which accompany it in the phosphorites, in combination with the sulfuric acid. By adding a small quantity of nitric acid to the sulfuric acid necessary to the treatment of phosphates, and by rendering possible and more rapid the complete disintegration of the molecule of the tribasic mineral phosphate, one obtains superphosphates very superior physically and chemically to those obtained by the reaction with the sulfuric acid alone.

The quantity of nitric acid necessary, according to the present invention for the treatment of phosphates may vary from 1% to 5%, and more, for every hundred kilograms of sulfuric acid at 50° Baumé, that is to say according to the quality of the phosphate under treatment. The best industrial results, however, are obtained by employing nitric acid at 41-42 Baumé, specific gravity 1400-1410, in proportions of from 3% to 4% of the quantity of sulfuric acid at 52-53 Baumé, specific gravity 1565-1580, less by 10% than that hitherto required for the treatment of 100 kilograms of phosphate.

The nitrous vapors resulting from the reaction may if necessary be recovered; the nitric acid employed may also be partially recovered. Consequently the nitric acid employed in the treatment of phosphates has the property of eliminating every trace of insoluble basic phosphates, thus rendering the product similar, physically and chemically, to bone superphosphate because containing nitrogen also; there is thus obtained an industrially and commercially superior superphosphate since it is more easily decomposed, dried and pulverized. It is, moreover, more economical since it requires less sulfuric acid, since even only slightly pulverized phosphates may easily be treated, thus economizing in the grinding, since superphosphates are obtained which contain more soluble phosphoric anhydrid, which can be sold immediately after manufacture and which are much more valuable and useful to agriculture since they have greater fertilizing value and are more easily assimilated and contain less free acid than the normal. Superphosphates thus obtained can never be liable, as are the ordinary superphosphates, to undergo retrogression; on the contrary the monobasic phosphates (superphosphates) obtained by my process are more pulverulent and drier, and contain a greater quantity of phosphoric anhydrid soluble only in water than the ordinary phosphates. When placed in the soil they have the property of spreading rapidly therein by appropriating to themselves the bases thereof, by being homogeneously converted into bibasic phosphates, that is to say into the condition for prompt and easy absorption and assimilation by the plant.

My new process of treatment eliminates certain difficulties of production, and economizes in sulfuric acid, whether phosphates rich in carbonate of lime, or in those which contain less quantities are used; it greatly accelerates the action of sulfuric acid on the tribasic phosphate in phosphates poor in carbonate of lime, as well as in those which are almost totally lacking in it. No matter with what phosphate one is working, the resulting product is a very spongy superphosphate, easily decomposed and dried, and having all the qualities already mentioned.

By employing nitric acid there is obtained an excellent superphosphate from a phosphate pulverized less than that hitherto employed, thus effecting a considerable economy in time and expense by grinding the phosphate with metal screens with slightly serrated plates. Another advantage is therefore obtained, that is less dust is produced in milling, a much greater efficiency of the mills being thus obtained than hitherto. It should also be noted that immediately after having finished the treatment of the phosphate, the superphosphate obtained gives $\frac{1}{2}$ unit more of phosphoric anhydrid soluble in water and of citrate of ammonium for each kilogram of superphosphates than could be obtained heretofore; and if it lies unused for a long time, the yield of soluble phosphoric anhydrids in superphosphates, in place of diminishing, increases from 3% to 7%. The superphosphates treated in this manner, even in large masses dry out and remain pulverulent, both in the body of the masses and at their base. Moreover, since the superphosphate obtained with a percentage of nitric acid has the property of being easily disintegrated and dried, it has the considerable advantage of completely avoiding the very grave inconvenience of nodules in the superphosphate itself.

I claim:

An improvement in the process of manufacture of superphosphates by means of the practical application of the reactive properties of nitric acid on phosphates mixed with sulfuric acid, said process consisting in employing phosphates pulverized to a slight degree combined with about 90% of the normal quantity of sulfuric acid, to which is added from 3% to 4% of nitric acid at 41–42 Baumé, for the purpose of obtaining superphosphates which are not subject to retrogradation in the content of phosphoric anhydrid, easily decomposable, more pulverulent and drier, richer in fertilizing material, more easily assimilated by plants than superphosphates made by methods now in use, and also more economical.

In testimony whereof I have affixed my signature in presence of two witnesses.

GIUSEPPE CUSATELLI.

Witnesses:
DUILIO NARDONI,
GIOVANNI BORTOLUZZI.